United States Patent [19]

Larson

[11] E Re. 29,087

[45] Reissued Dec. 28, 1976

[54] PARTICULATE MATERIAL SAMPLING DEVICE

[76] Inventor: Henry B. Larson, R.R. 1, Bement, Ill. 61813

[22] Filed: Jan. 6, 1975

[21] Appl. No.: 538,680

Related U.S. Patent Documents

Reissue of:

[64] Patent No.: 3,789,671
Issued: Feb. 5, 1974
Appl. No.: 193,925
Filed: Oct. 29, 1971

[52] U.S. Cl. ..... 73/423 R; 73/425.6

[51] Int. Cl.[2] ..... G01N 01/44

[58] Field of Search ..... 73/423 R, 421 R, 425.2, 73/422 R, 425.6; 175/213; 166/107

[56] References Cited

UNITED STATES PATENTS

| | | | |
|---|---|---|---|
| 1,994,884 | 3/1935 | Chew | 73/425.2 X |
| 2,726,548 | 12/1955 | Van Der List | 73/422 R |
| 3,198,265 | 8/1965 | Voelkerding | 73/421.5 X |
| 3,228,249 | 1/1966 | O'Brien | 73/421 B |
| 3,365,952 | 1/1968 | Wang | 73/425.2 |
| 3,412,613 | 11/1968 | Brown et al. | 73/425.2 |
| 3,524,352 | 8/1970 | Paul | 73/423 R |
| 3,683,677 | 8/1972 | Harris | 73/45.1 |

*Primary Examiner*—Richard C. Queisser
*Assistant Examiner*—Daniel M. Yasich
*Attorney, Agent, or Firm*—Johnson, Dienner, Emrich & Wagner

[57] ABSTRACT

This invention is a device for removing a sample of particulate material from predetermined locations in the mass of said material.

6 Claims, 2 Drawing Figures

PARTICULATE MATERIAL SAMPLING DEVICE

Matter enclosed in heavy brackets [ ] appears in the original patent but forms no part of this reissue specification; matter printed in italics indicates the additions made by reissue.

*BACKGROUND OF THE INVENTION*

This invention relates to a device for sampling particulate material. More particularly this invention relates to a device of simple and inexpensive design which is [ advantageous ] *particularly well adapted* for isolating and removing a sample of particulate material from the mass of said material. Further this invention relates to a device for sampling grain in trucks or other containers.

Obviously where a large mass or bulk of particulate material such as grain, oil seeds, meals or other finely divided material are transported to market by truck, railroad car or other means and offered for sale it is not possible to inspect the entire mass or bulk of material. Accordingly samples are typically removed for physical inspection and subjection to tests and analyses in order to determine the quality of the product being offered for sale as well as the extent, if any, to which it is subject to spoilage in storage. It will thus be apparent that accurate, representative sampling is the only valid basis for determining the true market value of grain and other finely divided materials offered for sale and where the sampling methods are not accurate and not representative *of* the market value of grain and other particulate materials may not reflect their true value.

In many, if not most, prior art applications sampling of particulate materials is done manually. Typically an operator positions a ladder alongside the truck, railroad car or other container to be sampled with a hand operated probe to be manually forced into the mass of material to be sampled. This procedure, while it does permit accurate representative samples to be taken, is disadvantageous. This method is slow and tedious and requires considerable physical strength on the part of the worker involved. Also the strength of the worker [ is ] *determines* the limit of the depth [ into ] *to* which a manually operated probe can penetrate. If the operator cannot force the probe all the way to the bottom of the mass of material, the sample is not representative, and may not accurately reflect the qualities of the entire mass or bulk of material. Accordingly, such a sample is not a dependable basis for making a qualitative determination of *the* condition of the mass of material.

Power has been used for sampling particulate material, such as the type referred to herein. [, however,- ] *However*, prior art devices, in comparison to the present invention, are slow to use, intricate of design, expensive to manufacture and susceptible to frequent breakdown.

The present invention is advantageous with respect to prior art devices, both manual and powered, because of its simplicity of design which permits a single operator to rapidly and efficiently take samples of grain or other particulate material from desired locations within the mass or bulk of said material. Applicant's device is further advantageous by reason of the fact that it is not expensive to operate and it is capable of providing a core sample representative of the bulk of material throughout the entire depth thereof.

As has been previously pointed out, the ability to *accurately* sample grain and other particulate material is very important. For example, if grain is in good condition it may be stored for long periods of time without damage. On the [ contrary ] *other hand*, where grain is subject to spoilage, which spoilage is not discovered promptly, serious losses may take place before discovery thereof and spoiled grain may contaminate other grain with which [ is ] *it* is [ comingled ] *commingled*. Therefore, it becomes apparent that it is advantageous, in order to proceed in the most efficient and [ economic ] *economical* manner, to take samples of grain or other particulate material in storage from a variety of depths of the storage container on a regular basis.

Therefore, an object of this invention is *to provide* a device for the sampling of particulate material. Another object of this invention is *to provide* a device for sampling particulate material with suction means. A further object of this invention is *to provide* a device [ to enable ] *which enables* a single worker to advantageously sample particulate material by withdrawing samples of said material from predetermined locations within the mass thereof by suction means.

Other objects of the invention will be apparent from the detailed description thereof which follows.

*DESCRIPTION OF THE EMBODIMENT SHOWN HEREIN*

Figures 1, 2:
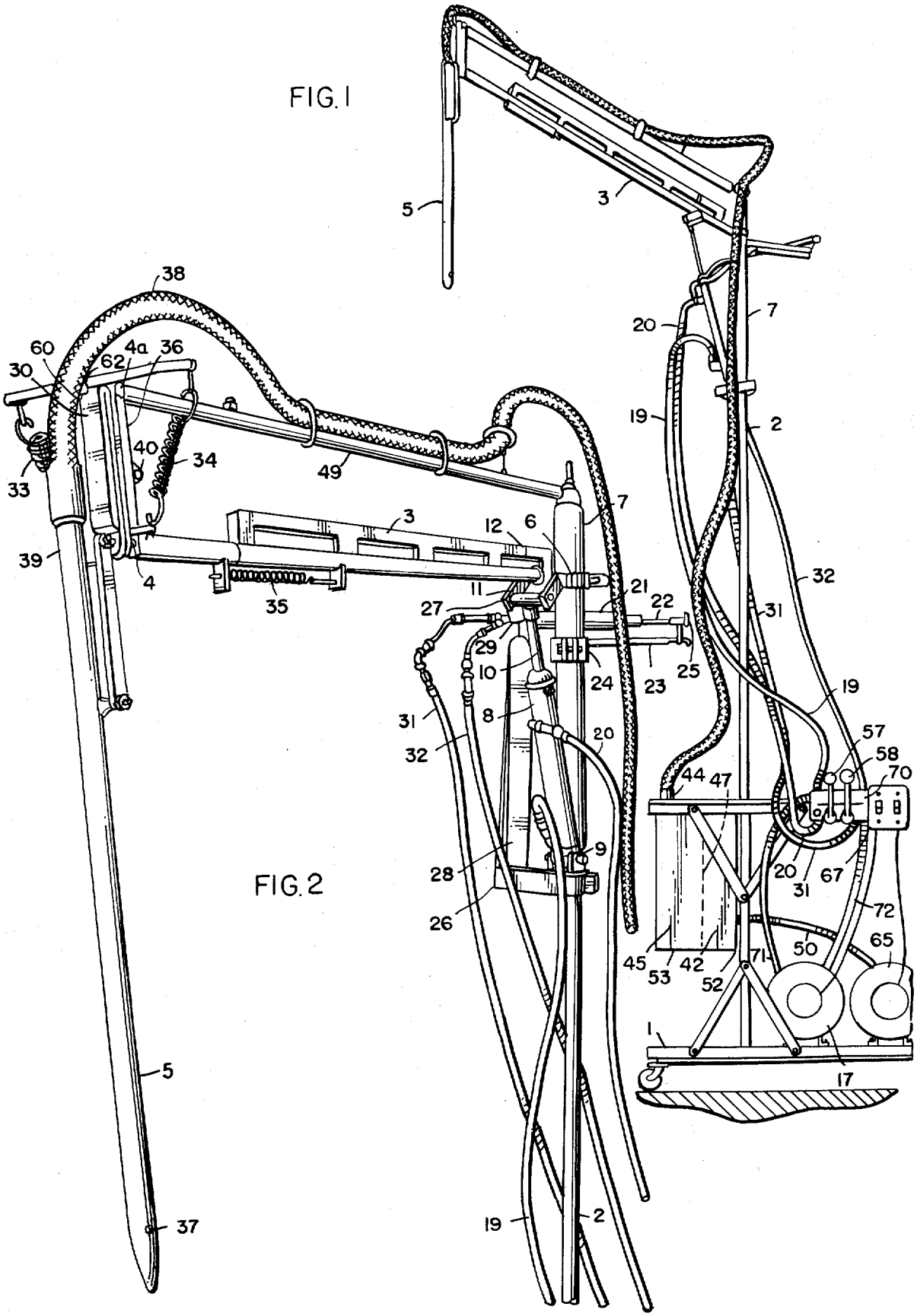
FIG. 1 shows an embodiment of the invention for separating a sample of particulate material from the bulk or mass thereof [ . ] *; and*
FIG. 2 [ illustrates in detail ] *is an enlarged detail view of* the upper portion of the embodiment [ depicted ] *shown* in FIG. 1.

Broadly, the present invention [ is ] *comprises* a device for sampling particulate material, which device includes a probe having an interior space and suction means to draw a sample of particulate material from [ the ] *a* mass of said [ probe ] *particulate material* into said interior space. [ Thereby ] *In the operation of such a device*, when said sample is drawn from the bulk of said material into [ said ] *the aforementioned* interior space, the sample is isolated from the mass of particulate material.

In [ a ] *the* preferred embodiment of the invention *shown in the drawings* a probe having an interior space and two openings therein is employed. Each opening forms a passageway from the interior space to the exterior of said probe. Means are employed to position said probe in predetermined locations with respect to the mass of particulate material to be sampled. Suction means is employed to draw a sample of particulate material through an opening near the tip of the probe into the interior space and [ therethrough by means of ] *outwardly through* the other opening in the probe into a sample container [ whereby the sample is isolated ] to thereby *withdraw the sample* from the mass of material.

Thus it will be seen that the present invention [ is advantageous with respect to ] *has advantages over* prior art devices. It is simple of design and relatively inexpensive to manufacture. Applicant's device is durable and can be controlled and operated by a single worker. It is relatively maintenance free. The device of the present invention permits rapid sampling of particulate material in contrast to the disadvantageous, cumbersome slow-moving devices known in the prior art.

Referring now to the drawings for purpose of illustration, the embodiment [of] *shown in* FIG. 1 [shows] *includes a* dolly 1 upon which is mounted *a* support pole 2. Support pole 2 is substantially vertical in position. [Sleeve] *A sleeve* 7 is rotatably fitted about *the* pole 2. [Support] *A support* arm 3 is pivotally attached to *the* sleeve 7 by means of *a* hinge 6, and *a* probe 5 is pivotally connected to *the* support arm 3 [at] *by a* hinge 4.

In the embodiment illustrated, *the* support pole 2 is shown attached to *the* movable dolly 1. In this embodiment the entire device may be moved about and positioned adjacent to the bed of a truck filled with grain so that *the* support arm 3 may be rotated about *the* support pole 2 into position over the bed of said material, from which position *the* probe 5 may be lowered into said material. [Support] *The support* pole 2 may suitably be rigidly connected to a permanent support in many applications. For example, it may be convenient to position [said] *the* support pole 2 in a permanent position adjacent *to* weighing devices commonly found at grain elevators.

As depicted in detail in FIG. 2, *the* support arm 3 is pivotally connected to *the* sleeve 7 by means of *the* hinge 6. [Hydraulic piston] *A hydraulic cylinder* 8 is pivotally connected to *the* sleeve 7, at the bottom of the sleeve *7*, by *a* hinge 9. [Piston] *A piston* rod 10 *extends from the cylinder 8, and* is pivotally connected at its upper end [extending from piston 8] to *the* arm 3 by *a* hinge 11.

The bottom portion of *the* sleeve 7 rides on top of *a* clamp 26 which is rigidly secured to *the* support pole 2. Hydraulic pressure is exerted upon [piston] *the cylinder* 8 by means of *a* pump 17 through *either one of two* hoses 19 [and] *or* 20. Accordingly, as piston rod 10 is raised *by exerting hydraulic pressure through hose 19* support arm 3 is raised, and as piston *rod* 10 is lowered *by hydraulic pressure in hose 20* support arm 3 is lowered.

In like fashion [piston], *a cylinder* 21 is rigidly fastened to *the* support pole 2 by *the* clamp 26. [Vertical] *A vertical* arm 28 is rigidly fastened to *the* clamp 26 and *an* end 29 of [piston] *the cylinder* 21. [Piston] *A piston* rod 22, *mounted in the cylinder 21*, is pivotally connected to *the* sleeve 7 by means of *a* rod 23 [and], *a* clamp 24, *and two* hinges 25 and 27. [Piston] *The cylinder* 21 is connected to *the* pump 17 by means of *two* hoses 31 and 32.

*There is provided a housing 70 into which hydraulic fluid flows from pump 17 through conduit 71. Fluid flows from housing 70 back to the pump 17 through the return conduit 72. Suitable manual controls are provided to direct hydraulic fluid under pressure into the various hoses or conduits 19, 20, 31 and 32. For example levers 57 and 58 may operate dual spool valves (not shown) of conventional design. When the spool valve operable by lever 57 is moved to one position, it will direct fluid into hose 19, and when moved to the other position it will direct fluid into hose 20. Likewise, when the spool valve operable by lever 58 is moved to one position fluid will flow therethrough to hose 31, and when moved to its other position fluid will flow through hose 32.*

[Probe] *The probe* 5 is rigidly connected to *a* plate 30. [Plate] *A plate* 36 is pivotally connected to *the* support arm 3 and *an* arm 49 at hinges 4 and 4a, [. Plates] *respectively. The plates* 30 and 36 are pivotally connected by means of *a* fastener 40 which includes a spring on said fastener between *the* plates 30 and 36 to permit movement of *the* probe 5 throughout a slight angle as it enters a bed of particulate material. This is advantageous when the probe is lowered into a bed of grain in a container the sides of which have a sloping configuration, *such* as, for example, the sloping sides of the beds commonly found in trucks used to haul grain. As *the* probe 5 strikes the sloping side of a truck bed in its downward path into a mass of particulate material the force exerted against the probe 5 can overcome springs 33, 34 and 35, and *the* probe 5 is thereby enabled to penetrate to the bottom of the sloping bed without damage to the probe.

The top of plate 30 is a cam with *a* concave indentation 60. [Plate] *The plate* 36 has *an* anchor pin 62 slidably spring[s] maintained at the top thereof. In normal operation, *the* pin 62 is maintained in indentation 60 to *hold the* probe 5 in a normally substantially vertical position. In the event, however, that the bed of particulate material, for example a truck loaded with grain, is unintentionally driven out from under *the* probe 5 before [its] *it is* raised up out of the bed, the force exerted on *the* probe 5 will eventually increase to a level sufficient to override the [spring maintained a] *springs maintaining the* pin 62 in *the* indentation 60. [Thereby] *Thus, the* pin 62 will be raised up out of the indentation *60* and *the* probe 5 will then be freed to pivot out of danger in response to the force exerted upon it. [Probe] *The probe* 5 may then later again be centered by returning it to its normal position at which point *the* pin 62 will again drop into *the* indentation 60.

[Probe] *The probe* 5 is an elongated hollow probe with an opening 37 near the tip thereof. At the opposite end of [said] *the* probe *5*, *a* conduit, [advantageously comprising rubber tubing] *preferably in the form of a rubber tube 38*, is connected to the opening at the top *39* of [said] *the* probe [39] *5*. [Tube] *The tube* 38 is sealed onto *the* probe 5 at *the* top 39 by any conventional means known in the art in order to permit a vacuum to be drawn by suction means through [said] *the* tube *38*. [Tube] *The tube* 38 is supported on *an* arm 49 and *the* tube 38 is connected to *a* sample box *or container* 42 at [its] *the* inlet 44 *of the latter*, near the front of [said] *the* container *42*.

[Sample] *The sample* container 42 contains *a* sample chamber 45 at the rear of which is *disposed a* mesh screen 47. [At] *A vacuum line 50 is connected between* the [top] rear portion of *the* sample container 42 [vacuum line 50 is connected to] *and a* vacuum pump 65. [Sample container 42 may conveniently include part] *Part* or all of one wall [thereof] *of the sample container 42 may be constructed* of glass or other transparent material capable of withstanding the pressure differential to which it is subjected, so *that* a worker may readily observe the level of sample in *the* sample chamber 45. The bottom *53* of *the* sample chamber 45 is pivotally connected to *the* container 42 at 52, and said bottom panel 53 may be opened to release the contents of *the* sample chamber 45.

In operation, *the* dolly 1 is positioned adjacent to the container of particulate material to be sampled. [Support] *The support* arm 3 is then raised [over] *above* the bed of material to be sampled by *directing* hydraulic

*fluid under pressure into* [piston] *cylinder* 8 *through hose 19* and *may then be* rotated about *the* support pole 2 by [piston 21 to] *actuation of the piston 22 in the cylinder 21 due to fluid pressure in hose 31 or 32 to* position *the* probe 5 above and over the bed of material to be sampled in response to actuation of *the* known control means [in lines 19–20 and in lines 31–32, such as controls 57 and 58. Probe] *57 and 58 heretofore described. The probe* 5 is then lowered, by again [activating said] *actuating the* controls 57 and 58, to *thereby cause the probe 5 to* penetrate to the desired depth into the mass of particulate material to be sampled. As *the* controls 57 and 58 are again actuated to raise *the* probe 5 and remove it from a bed of material [to be] *being* sampled, *the vacuum* pump 65 is actuated by [pressure] *a* switch 67 *which may be operated manually, or which may be a pressure switch operable by* responding to *fluid* pressure [differential] in line 19 [and draws] *to thereby draw* a vacuum through *the* conduit 38 [and] into *the* probe [39] *5*, whereby particulate material to be sampled is drawn through opening 37 in [said] *the* probe *5*, through the hollow inner portion of [said] *the* probe *5 and* into *the* conduit 38, through which it flows into sample container 42. [Sample] *Preferably, the sample* is continuously taken from the mass of material as probe 5 is withdrawn *therefrom*, with the result that when *the* probe 5 is removed from the mass of material and all the material which has entered *the* probe 5 through [point] *the opening* 37 has passed into *the* sample container 42, the sample [therein] *in the container 42* is an accurate representative sample of the particulate material at all depths of the mass [to be] *being* sampled.

It will be apparent that *the* controls 57 and 58 may be actuated in [connection] *conjunction* with *the operation of the* suction means 65 *so as* to position *the* probe 5 and *the* opening 37 therein in any selected predetermined location with respect to the mass or bulk of material to be sampled. [Thereby] *Thus*, a complete sample may be taken from any particular given location in the mass of material by maintaining probe 5 in a [constant] *stationary* position until *the* sample chamber 45 of *the* sample container 42 is filled. Likewise, [suction means 17] *the vacuum pump 65* may be actuated [in order] *in such a manner that it is effective* to draw a sample into *the* probe 5 either as the probe is penetrating into the mass of material to be sampled or as it is withdrawn in order to obtain a representative sample of the entire depth or cross section or core of said material.

Thus, it will be apparent that the invention is not limited to the structure in the exact method described above but shall also include other structures and combinations [following] *falling* within the broad scope and spirit of the invention, the detailed description, and the claims which follow.

What is claimed is:

[1. A sample probe device comprising an elongated support pole, a support arm having an inner and outer end, said support arm being pivotally connected to said support pole at the inner end thereof, an elongated hollow probe pivotally connected to the outer end of said support arm, said probe having an opening into the interior thereof adjacent each end of said probe, a sample container including a sample chamber and means to trap said sample therein and means to remove sample material from said container, vacuum conduit means connecting the end opening of said probe adjacent said outer end of support arm with said sample container, separate hydraulic means to move said support arm along the longitudinal axis of said support support pole and rotate said support arm about said support pole, and suction means actuated by means responding to a pressure differential in the hydraulic means upon actuation by said hydraulic means to move the support arm about said support pole to draw a vacuum through said probe, conduit means, and said sample chamber and to continue to draw a vacuum within said sample container when the sample chamber of said container is filled with sampled material whereby when said probe is in selected predetermined locations with respect to the mass thereof said sample is drawn through said probe into said conduit means and therethrough so as to be trapped into the sample chamber of said sample container.]

*2. A sample probe device for obtaining samples of particulate material comprising an elongated support pole; a support arm having an inner end and an outer end, said support arm being mounted at the inner end thereof on said support pole for movement with respect thereto in both vertical and horizontal planes, an elongated probe pivotally connected to said outer end of said support arm, said probe having an opening in each end portion thereof and being hollow between said openings, conduit means connected to one of said openings in one end of said probe, means for moving said support arm both horizontally and vertically relative to said support pole for horizontally positioning said probe relative to a mass of such particulate material to be sampled and reciprocating said probe downwardly and upwardly through said mass, and means, including a normally inoperative vacuum pump operatively connected to said conduit means for creating a vacuum therein and thereby causing particulate material to be drawn from said mass through said opening in the other end of said probe, the interior of said probe, said opening in said one end of said probe and said conduit means when said other end of said probe is disposed in said mass, and control means operatively connected to said pump and adapted to render said pump operable to create said vacuum in said conduit means during movement of said probe upwardly through said mass.*

*3. A sample probe device as defined in claim 2, and in which said means for creating a vacuum in said conduit means includes a sample container, for receiving said particulate matter so drawn through said conduit means, operatively connected between and to said pump and said conduit means.*

*4. A sample probe device as claimed in claim 3, and in which said sample container is separated into two chambers by perforated means disposed therein, said pump is operatively connected to one of said chambers, and said conduit means is connected to the other of said chambers.*

*5. A sample probe defined in claim 2, and in which said means for moving said support arm comprises hydraulic means operatively connected thereto, and control means operatively connected to said hydraulic means for selectively controlling movement of said support arm horizontally and vertically independently of each other.*

*6. A sample probe device as defined in claim 5, and in which said first mentioned control means is operatively connected to said hydraulic means for actuation thereby effective to so render said pump operable to create said vacuum during movement of said probe upwardly.*

*7. A sample probe device for obtaining a sample of particulate material comprising an elongated support pole, a support arm having an inner and outer end, said*

*support arm being pivotally connected to said support pole at the inner end thereof, an elongated hollow probe pivotally connected to the outer end of said support arm, said probe having an opening into the interior thereof adjacent each end of said probe, a sample container including a sample chamber and means to trap the sample therein and means to remove sample material from said container, vacuum conduit means connecting the end opening of said probe adjacent said outer end of said support arm with said sample container, separate hydraulic means to move said support arm along the longitudinal axis of said support pole and rotate said support arm about said support pole, control means, and suction means selectively operable by said control means to draw a vacuum through said probe, said vacuum conduit means, and said sample chamber and to continue to draw a vacuum within said sample container when said sample chamber of said container is filled with sampled material, whereby when said probe is in selected predetermined locations with respect to the mass thereof said sample is drawn through said probe into said conduit means and therethrough so as to be trapped into said sample chamber of said sample container.*

* * * * *